H. G. Davis.
Cotton Picker.
N° 4,050.   Patented May 16, 1845.
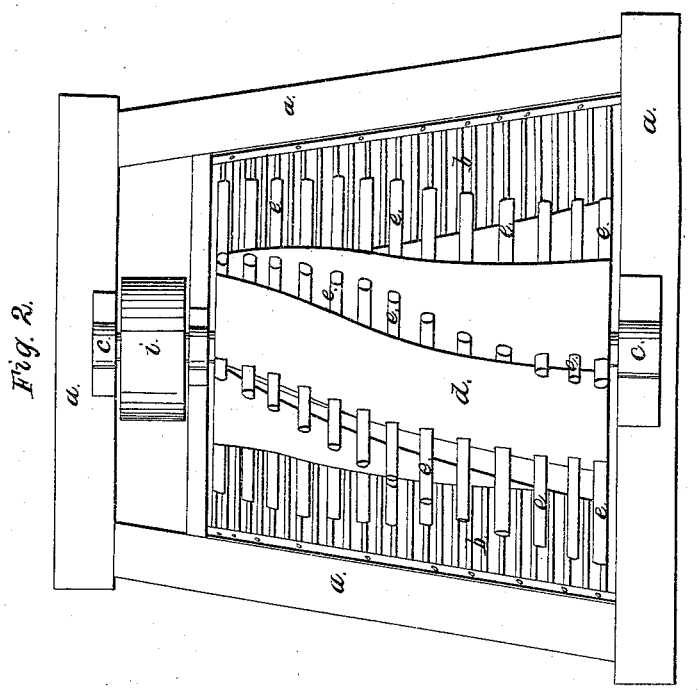
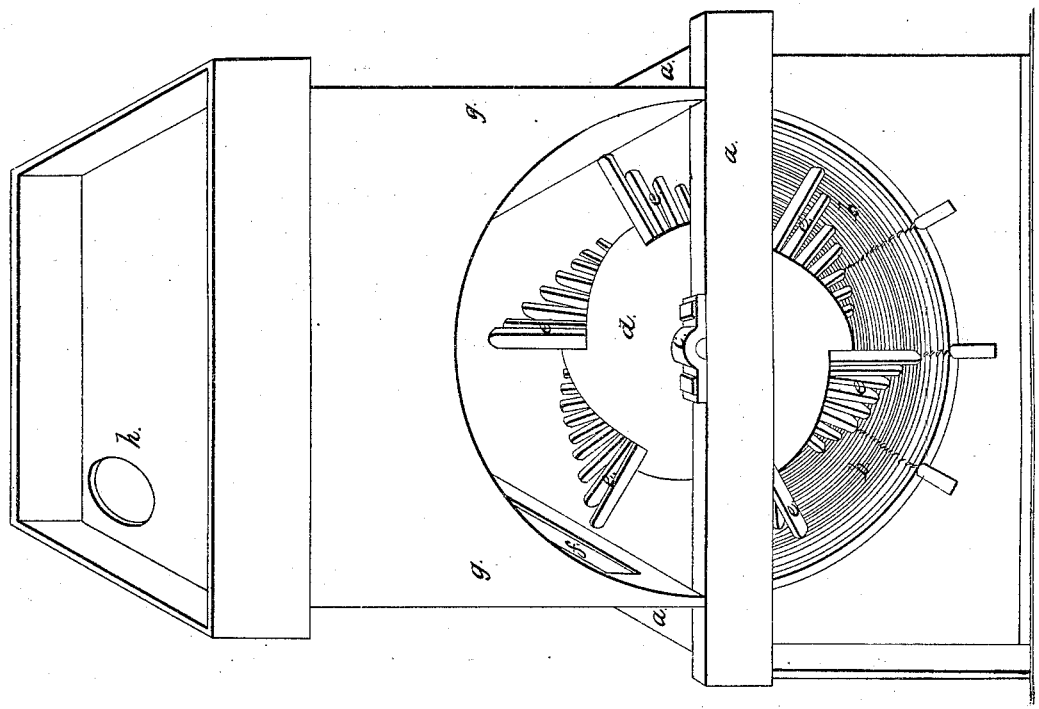

UNITED STATES PATENT OFFICE.

JANE A. DAVIS, OF CLARKE COUNTY, ALABAMA, ADMINISTRATRIX OF HENRY G. DAVIS, DECEASED.

COTTON WHIPPER AND CLEANER.

Specification of Letters Patent No. 4,050, dated May 16, 1845.

*To all whom it may concern:*

Be it known that H. G. DAVIS, deceased, of the county of Clarke and State of Alabama, did invent a new and useful Improvement in Cotton-Cleaners; and I do hereby declare that the following is a full, clear, and exact description thereof, reference being had to the accompanying drawing, which forms a part of this specification, in which—

Figure 1, is a perspective view. Fig. 2, a sectional plan showing the conical runner and its concave.

The machine is constructed as follows: A suitable frame is made consisting of four pieces (*a*) Figs. 1 and 2, which supports a semicircular conical formed concave (*b*) and on which also are fastened the boxes (*c*) in which the journals of the runner (*d*) turn; this frame is supported sufficiently high to raise the concave above the floor on which the machine stands to leave a space for the dirt &c., from the cotton to fall through, the concave (*b*) being formed of wire or other open work.

The runner (*d*) is conical and truncated; it is spirally fluted or grooved around its outside forming six more or less wings which are formed in the cross section by drawing a curved line from the periphery spirally inward around one sixth the diameter and thence out to the periphery on a radial line to the periphery again when a second commences and so on all around the circumference; the spirality of this groove from end to end of the cylinder is about one quarter the circle; from the lowest part of the groove, teeth or pins (*e*) project, parallel with and resting against the radial side of the groove; they extend beyond the outer circumference of the cylinder and serve to beat up the cotton that is fed in, while the flat radial side of the groove serves as a fan to raise a blast outward which is supplied with air through an aperture (*f*) in one side of the cover (*g*) that sits onto the frame over the runner; the top (*n*) of the cover has a hole in it over the small end of the runner and a rim up all around to form a hopper to hold the cotton before it is fed in through said hole to the runner.

The cotton is thrown out at the large end of the concave shown at Fig. 1.

The runner is driven by a band from a pulley (*i*) on the shaft.

Having thus fully described the improvement what I claim therein as new and desire to secure by Letters Patent is—

The runner constructed as herein described, having spiral wings therein, from which project rows of pins, substantially in the manner and for the purpose herein made known; and, in combination therewith, the grated concave as above set forth.

JANE A. DAVIS,
*Administratrix of the estate of Henry G. Davis, deceased.*

Witnesses:
F. L. SEWALL,
PETIE DUBOU.